March 10, 1931.  P. L. McKEE  1,796,113
VENTILATOR DOOR CONSTRUCTION FOR GREENHOUSES AND THE LIKE
Filed Dec. 19, 1927  2 Sheets-Sheet 1
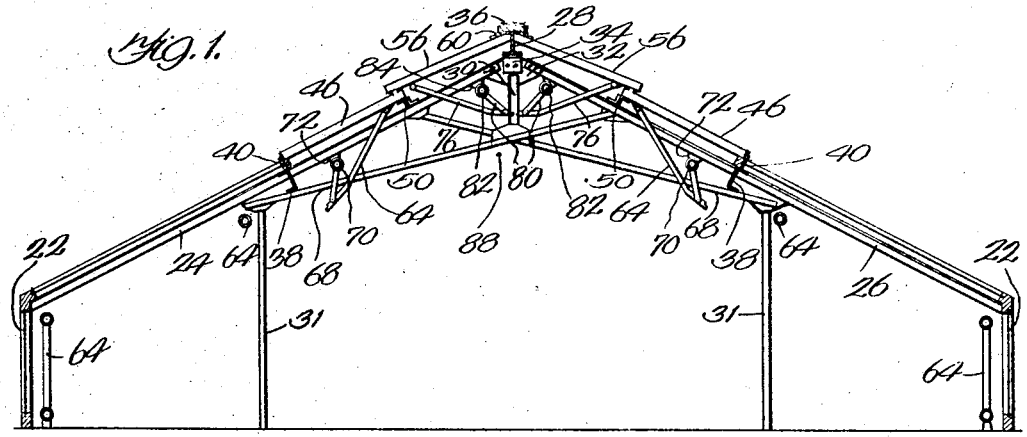
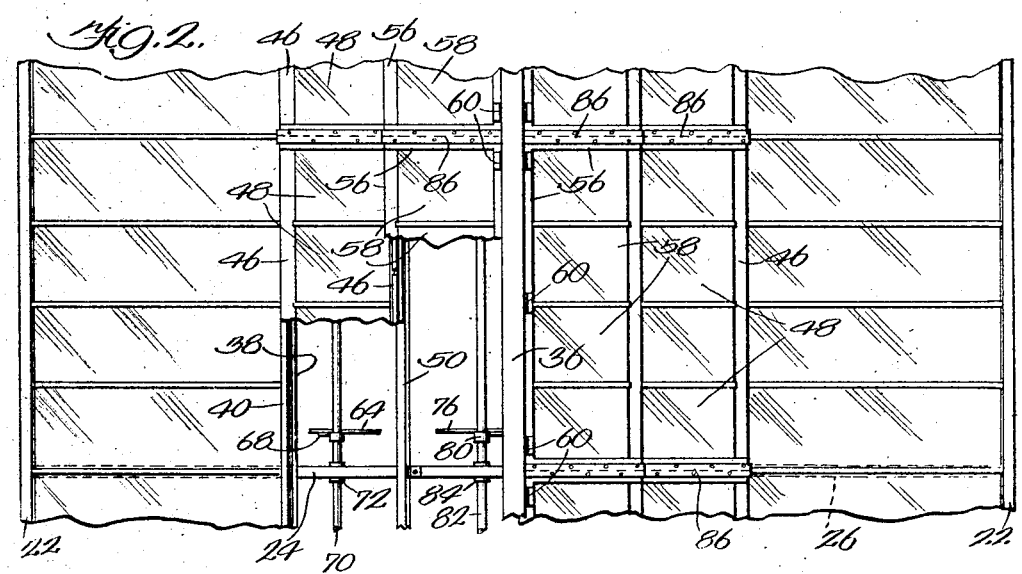
Inventor:
Philip L. McKee
By Cheever & Cox, Attys.

March 10, 1931.  P. L. McKEE  1,796,113
VENTILATOR DOOR CONSTRUCTION FOR GREENHOUSES AND THE LIKE
Filed Dec. 19, 1927  2 Sheets-Sheet 2

Inventor
Philip L. McKee
By Cheever r Cox Atty.

Patented Mar. 10, 1931

1,796,113

UNITED STATES PATENT OFFICE

PHILIP L. McKEE, OF CHICAGO, ILLINOIS

VENTILATOR-DOOR CONSTRUCTION FOR GREENHOUSES AND THE LIKE

Application filed December 19, 1927. Serial No. 240,987.

My invention relates to the construction of greenhouses and particularly to the manner of providing ventilating openings for the inclined roofs of the greenhouses.

In the present-day greenhouse construction it is the practice to provide a number of greenhouse units side by side to cover a given area of ground. These greenhouses are formed with substantially inclined roofs which converge upwardly to a point directly over the central longitudinal portion of the greenhouse and transverse of the width thereof. In the prior constructions these upwardly converging roofs are provided with outwardly opening ventilating windows which extend in opposite directions from each side of the ridge pole, so that when these outwardly extending windows are opened fresh air is admitted at the top portion of the greenhouse. In addition each greenhouse of heretofore existing construction has been provided along its vertical lateral walls and in some instances along the lower portions of its upwardly inclined glass roofs, with heating pipes for the purpose of heating the air which goes through these ventilating windows on each side of the ridge pole which are opened for that purpose.

Up to the present time it has been the practice in certain instances when providing a plurality of these greenhouse units to arrange them side by side; thus, for instance, where it was desired to provide two of these greenhouse units to double the capacity of a single greenhouse unit, the two were arranged side by side, and each unit was provided with two oppositely extending and outwardly opening windows on each side of the ridge pole.

One of the main objects of my present invention is to provide a unit greenhouse of double the ground floor area of a single heretofore existing greenhouse unit, which improved unit of larger area also includes an additional air space immediately beneath and adjacent its ridge pole, and wherein the vertical lateral walls of the larger unit are maintained as of the same height as the single unit, but wherein the upwardly slanting roofs converge to a ridge pole located at a height somewhat greater than the height of the ridge pole of a single unit but not twice as high, and whereby to create a much larger air circulating space immediately beneath the ridge pole of the enlarged unit and wherein such enlarged construction is provided with two ventilating windows on each side of the ridge pole to permit free access of an unusually large quantity of air to this larger air space, by which arrangement the increased volume of fresh air coming into this larger unit is prevented from directly coming into contact with the growing vegetation without first becoming heated by the heating system disposed along the vertical walls and along the lower portions of the inclined roofs.

Still another object of my invention resides in the details of construction of the double windows on each side of the ridge pole of my enlarged greenhouse unit whereby to insure not only a much larger fresh air chamber at the top of the greenhouse beneath the ridge pole, but also to permit the entrance of a relatively greater quantity of air than has heretofore been admitted, and wherein such air is sufficiently heated before coming in contact with the vegetation in the greenhouse.

Still another object of my invention resides in the details of construction of the inclined roofs, their supporting means, the manner in which the ventilating window sashes are movable on said supporting beams and ridge pole and the manner in which these windows are operated.

These and other objects of my invention will become apparent from a perusal of the following specification when taken in connection with the accompanying drawings, wherein—

Fig. 1 is a side view partly in section of my enlarged greenhouse unit provided with the novel arrangement of double ventilating windows on each side of the ridge pole;

Fig. 2 is a top plan view of the same with certain parts broken away;

Figure 3:
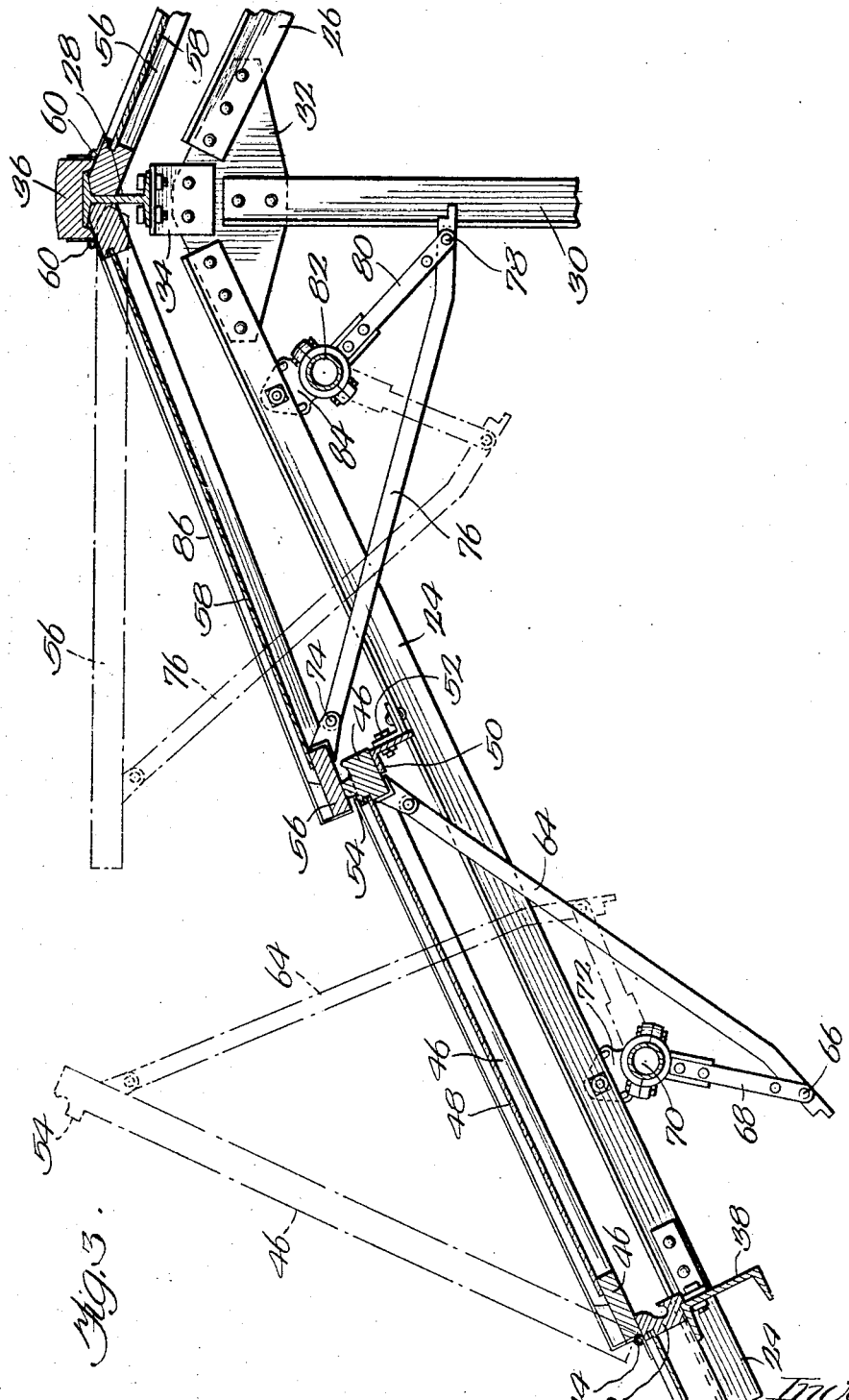
Fig. 3 is an enlarged detail view of the construction of the inclined roof and the manner of mounting the ventilating window sashes thereon.

Referring now to the drawings, it will be observed that in my improved construction which is shown in full lines in Figs. 1 and 3 of the drawings, I construct my enlarged greenhouse unit by forming the vertical side walls 22 of the same height as the heretofore existing single units; and I arrange these vertical walls 22 in spaced-apart relation and distance so as to cover double the amount of ground area heretofore enclosed in a single unit.

However, in my improved and enlarged construction the upwardly inclined roofs 24 and 26 are extended beyond the height of the usual ridge pole of the single unit, to a point wherein the ridge pole 28 of my improved construction is disposed considerably above the height of the ridge pole of a single unit, but not twice the height. I preferably support this ridge pole 28 and the beam forming the upwardly inclined roofs 24 and 26 by means of the usual cross truss beams and central poles 30 carried by the laterally disposed supports 31 extending at sufficient intervals longitudinally of the inclined roofs. It will be noted that in my enlarged or double unit construction the ridge pole 28 is approximately three times the height of the vertical wall height 22.

The support 30 is preferably an angle-bar and has riveted at its upper end a cross piece 32, to the opposite portions of which are riveted the upper ends of the roof supporting I-beams 24 and 26 respectively. In addition at the top of the cross piece 32 and between the ends of the beams 24 and 26 and immediately on top of the support 30, I rivet a second cross support 34 which has riveted to it and mounted thereon a metallic I-beam extending longitudinally of the greenhouse. This I-beam constitutes a part of the ridge pole and supports the ridge pole cap 36. The details of construction of this I-beam 28 and ridge pole cap 36 and the manner of supporting all the window ventilating sashes therefrom, while disclosed herein are not claimed since they form the subject matter of a separately formed application concurrently pending herewith.

At a point substantially midway the length of the inclined roof beams 24 and 26 I rivet to the underside thereof a preferably metallic cross beam 38 which forms a support for the stationary window sash 40, in which is mounted the usual transparent pane 42, which sash or a multiple number of sashes extend downwardly in an inclined formation to the top of the vertical wall 22. At the top of this window sash 40 I provide a hinge 44 to which I hingedly connect a pivotally mounted sash 46 carrying a transparent pane 48. This sash is adapted to be supported when in closed position on an angularly shaped metal beam 50, riveted as at 52, to the outside of the roof beam 24. In addition this sash 46 is provided on its outer surface with an upstanding shoulder 54 which forms a spacing member to receive a second movable sash 56 carrying a pane 58, which sash is pivoted as at 60 to the outer lower side of the ridge pole cap 36.

It will be noted that the free end of the sash 56 overlaps the free end of the sash 54 so that water will drain downwardly from the roof without entering the greenhouse. It will also be noted that the construction on each side of the ridge pole 36 is the same.

In order to open and close the window sashes 46 and 56 I provide suitable lever mechanism. For instance, the window sash 46 is provided with a pivotal connection, with a lever 64 pivotally connecting as at 66, with a short arm 68 rigidly mounted on a shaft 70 carried by a bracket 72 mounted on the underside of the roof beam 24. This shaft 70 extends longitudinally of the roof and is operable at the end of the greenhouse by a gear and chain or any other suitable mechanism. In addition the window sash 58 is operated by means of a pivotal connection 74 and lever 76, in turn pivotally connecting as at 78 with a short arm 80 rigidly mounted on a shaft 82 carried by a hanger 84 mounted on the upper portion of the roof beam 24. This shaft 82 is likewise operable like the shaft 70 so that when these shafts are turned the window sashes 46 and 56 are opened and closed, the closed position being shown in dotted lines in Fig. 3.

Manifestly the construction on the other side of the ridge pole is similar. These sashes 54 and 56 which may be opened and closed are arranged in sections extending longitudinally of the greenhouse and the adjacent sections of these sashes have their free edges provided with galvanized vent joint covers 86 shown more clearly in Fig. 2, which covers are in the form of strips adapted to overlie the lateral edges of the sashes so as to prevent the passage of water therebetween.

Due to this construction, it will be seen that I have provided in addition to the air circulating spaces which were present in the single unit greenhouses, an additional relatively large air space 88, which is that portion which lies between the two single units when they are placed side by side and which heretofore was not utilized.

In my present invention the construction of a single unit greenhouse provided with this additional air space 88 is a very important feature of my invention when considered with relation to the manner in which I have provided the upwardly inclined roofs 24 and 26 with ventilating windows on each side of the ridge pole 28. For instance, in my improved construction instead of providing two windows, one on each side of the ridge pole, I now provide two outwardly opening ventilating windows 46 and 56 arranged in pairs on each side of the ridge pole 28; and I provide each of these windows with appropriate lever-operated connections for opening and closing these windows independently in the manner heretofore described.

As shown in dotted lines in Fig. 3 of the drawings, when these windows 46 and 56 are opened a relatively large volume of fresh air is permitted to enter the greenhouse, and it will be noted that this air flows immediately into the enlarged circulating air space 88 directly beneath the ridge pole 28, and since this ridge pole 28 and the adjacent pairs of windows are elevated considerably above the top portions of the vertical walls 22, the air will not come into direct contact with the vegetation in the greenhouse, but on the contrary will circulate outwardly and downwardly where it will come in contact with the heating pipes 64 along the vertical walls 22 of the greenhouse and along the lower portions of the inclined roofs 24 and 26, where this fresh air will become heated and again thence pass into contact with the growing vegetation within the greenhouse.

One of the main advantages of my present invention resides in the fact that the ventilating window 46, when thrown open to the dotted line as shown in Fig. 3, constitutes a wind deflector for the opened window 56. In prior constructions where there was only one window such as 56, the wind blew beneath this window, forced it backwardly and tore it from its hinges 60. In the present construction this disadvantage is entirely eliminated since the inclined surface of the window 46 deflects the wind upwardly over the opposite opened window 56.

It will be seen that by reason of my improved arrangement of a single enlarged unit wherein the ridge pole is elevated considerably above and directly over the central longitudinal axis of the greenhouse, and by arranging on each side thereof two ventilating windows, I am enabled to not only double the size of a single unit of greenhouse when considering the square footage of the floor space, but in addition I am enabled to considerably more than double the air circulating space thereabove, and further permit the use of four ventilating windows to allow the entry of a large volume of fresh air without bringing it into direct contact with the vegetation.

It will also be evident that by reason of my peculiar arrangement of hingedly mounting these pairs of windows on each side of the ridge pole 28 and particularly in the manner in which the free end overlaps the free end of the window 46 and is mounted on the sash 40 on the roof beam 24, the construction being the same on each side of the ridge pole, I am enabled to cause the water to shed off the roof and not into the greenhouse. It will also be apparent that with this construction the uppermost windows 56 may be opened slightly with the windows 38 and 42 closed, or the upper windows 56 may be opened slightly and the windows 46 also opening slightly in a manner so that the free edges of the windows 56 will still overlie the windows 46 whereby the water will drain from the upper windows 56 when opened slightly onto the inclined surfaces of the windows 46, thereby preventing the drain water from flowing into the greenhouse while still permitting the windows to be open.

Having thus described my invention what I claim as new and desire to secure by Letters Patent is:—

1. A greenhouse construction having vertical walls terminating in upwardly inclined transparent roof members converging to form the central and longitudinally extending ridge pole, each of said roofs having two spaced-apart longitudinally extending beams, a window hingedly mounted to one of said beams and having its free end normally closing upon the other beam, and a second window hingedly connected to one side of the ridge pole and adapted to overlie the free edge of the first mentioned window when in closed position, said pairs of windows being of similar construction on each side of the ridge pole whereby to admit a large volume of air in the upper portion of the greenhouse.

2. In a greenhouse construction, the combination of the vertical walls, upwardly inclined beams thereon converging at a point centrally located with respect to said walls, a supporting pole joining the inner ends of said beams, a ridge pole mounted on said pole, cross beams mounted on the under surfaces of said roof beams substantially midway their lengths, stationary window sash members mounted on said cross beams, a first movable window sash member hingedly mounted on said stationary window sash member, a second cross support rigidly mounted on the outer face of said roof beams and adapted to support the free end of said first movable window when closed, a second movable window sash hingedly mounted to the side of said ridge pole and adapted when closed to rest on the outer face of said first movable window sash, and means for opening and closing said movable window sashes.

In witness whereof, I have hereunto subscribed my name.

PHILIP L. McKEE.